United States Patent Office 2,696,454
Patented Dec. 7, 1954

2,696,454

PARENTERALLY ADMINISTRABLE AQUEOUS SOLUTIONS OF SULFA-COMPOUNDS AND PROCESS OF PREPARATION THEREOF

Robert Behnisch and Josef Klarer, Wuppertal-Elberfeld, Germany, assignors to Schenley Industries, Inc., New York, N. Y., a corporation of Delaware No Drawing. Application December 12, 1950, Serial No. 200,508

Claims priority, application Switzerland December 12, 1949

10 Claims. (Cl. 167—51.5)

This invention relates generally to chemotherapeutically useful compositions and, in a more particular sense, it is concerned with substantially neutral aqueous mixtures, suitable for parenteral administration, containing, in dissolved state, a relatively large proportion of one or more sulfa drugs or compounds closely related thereto in chemical structure and therapeutical utility.

Among the most efficacious of the sulfa drug preparations hitherto used for combating bacterial infections are those obtained by combination of various sulfonamides with sulfones. The products that have proved to be especially valuable in attaining a particularly broad therapeutical range are those in which one component consists of a heterocyclic substituted sulfonamide, for instance, one of the series of sulfapyrimidines, of sulfapyridines, of sulfathiazoles or of sulfathiodiazoles, and the other component is a sulfonamide or sulfone of the type that is effective against anaerobic bacteria, such as a 4-aminoalkyl-benzene-sulfonamide or a 4-aminoalkyl-phenyl-alkyl-sulfone, which is in the composition in the form of a quaternary salt-like compound wherein the basic amino group is neutralized by the acidic group of another sulfonamide or sulfone, for instance, by sulfathiourea, by a 4-amino-benzene-sulfonic acid-acylamide or by a sulfaalkyl-thiodiazole. For example, a quaternary salt-like compound of this type could be produced by interrelation of 4-aminomethyl-benzene-sulfonamide and sulfathiourea which may be represented as follows:

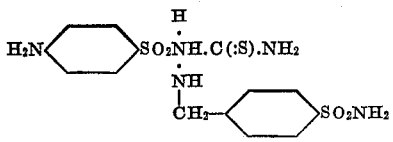

These compositions of two, or at most three, sulfonamide derivatives and sulfones are only sparingly soluble in water and, therefore, are not suitable for administration by parenteral injection. The basic requirements that a product must meet in order to be acceptable for parenteral administration are as follows: the aqueous solution of the composition must have initially and maintain the full activity of the previously insoluble components, it must be of substantially neutral reaction, the active material must have a high degree of solubility in the solution, and the quaternary salt-like component must resist decomposition because only its salt-like character can assure a good compatibility of the component which is effective against anaerobic bacteria. It is found that, if an attempt is made to dissolve the composite product in an inorganic or organic base, an undesirable increase of the alkalinity of the solution occurs and, furthermore, these solutions tend to hydrolyze upon storage, with the elimination of the salt-like ingredient which is the least acidic component.

Though it is known that certain sulfonamides can be made more soluble in water or aqueous mixtures by reacting them, in substantially equimolecular proportion, with a condensation product of one mol of a α.β-unsaturated aldehyde which has been condensed with two mols of an alkali bisulfite, it has been found that difficulties arise when attempting to adapt this reaction to the quaternary salt-like compounds above mentioned, and, furthermore, the heterocyclic substituted sulfonamides are only incompletely dissolved by the said condensation product. For obtaining stable solutions of such materials, it is found that a substantially larger proportion of the condensation product must be used than is needed with other types of sulfa compounds, for instance, if sulfapyrimidine is used, for each mol, two mols of the aldehyde-bisulfite-condensation product must be used, with the result that the compatibility of the solution thus obtained is unfavorably influenced.

It is now found, in accordance with this invention, unexpectedly and contrary to what might be reasonably inferred from the foregoing, that the reaction product of one mol of sulfonamide and two mols of aldehyde bisulfite, surprisingly, is capable of dissolving one mol of the insoluble quaternary salt-like compound above described, without the heterocyclic substituted sulfonamide being precipitated thereby. Thus, it now is possible, by using a suitably selected combination of three sulfonamides, to use merely two mols of aldehyde bisulfite to effect solution of three mols of the sulfonamides. Solutions prepared in this manner meet the requirements for parenterally administrable compositions as set forth above and, furthermore, have a broader thereapeutical range, thus providing an interesting enrichment of the medical arts.

The reactions by which these products may be obtained preferably are carried out in aqueous solutions, at temperatures of 70–90° C., although they also may be performed more slowly at lower temperatures. Solutions prepared in this manner, and with the components in the said molar ratio, are of satisfactory stability for ordinary purposes, but if it is desired to produce products that retain their stability against hydrolysis at higher temperatures, for instance, during sterilizing at temperatures of about 100 to 120° C. it is desirable to add a slight excess of the aldehyde-bisulfite condensation product, for instance, about 5–10%. These solutions may be, and preferably are, directly therapeutically employed, without need for isolation of the complex reaction product. Cinnamaldehydes, acrolein or croton aldehyde are preferred for use as the aldehydes for the making of the aldehyde-bisulfite condensation products.

To facilitate an understanding of how the principles of this invention may be applied in practice, two illustrative examples follow.

Example 1

A solution containing approximately 208 grams (about 2 mols) of sodium bisulfite in 800 cc. of water is mixed with about 132 grams (approximately 1 mol) of cinnamaldehyde and the mixture is gently heated until the aldehyde has been dissolved and reacted. Approximately 125.5 grams (about .48 mol) of 2-(p-amino-benzene-sulfonamido) - 4 - methyl-pyrimidine are introduced, with stirring, and the solution is then heated to about 80° C. and maintained at this temperature until it is clear. Approximately 198 grams (about .47 mol) of the quaternary salt of 4-amino-benzene-sulfothiourea with 4-aminomethyl-benzene-sulfonamide in equimolecular ratio is added and the mixture is heated for another hour. After adding 20 grams of activated charcoal, the light-yellow solution is filtered and adjusted to the concentration desired. This solution, which effectively has as its potent components, 2 - sulfanilamido - 4-methyl-pyrimidine, sulfanilythiourea and 4-aminomethyl-benzene-sulfonamide, each in a half molar ratio to the cinnamaldehyde bisulfite condensation product, is suitable for parenteral administration for therapeutical purposes.

Example 2

Cinnamaldehyde and sodium bisulfite are condensed in the quantities and the manner described in Example 1, and this solution is then reacted, first with approximately 119 grams (about .47 mol) of 2-sulfanilamido-pyridine, and then with about 212 grams (approximately .51 mol) of the quaternary salt of N'-acetyl-sulfanilamide with 4-aminomethyl-phenyl-methyl-sulfone. The product is a solution having chemotherapeutical utility comparable to that obtained as described in Example 1.

If desired, similar products may be produced by repeating the operations described in each of the foregoing examples, substituting about 56 grams (approximately 1 mol) of acrolein or about 70 grams (approximately 1 mol) of crotonaldehyde for the cinnamaldehyde there employed. Likewise, other alkali bisulfites may be used in place of the sodium bisulfite providing equivalent molar proportions are employed.

Having thus described the subject matter of the present invention, what it is desired to secure by Letters Patent is:

1. Process for the manufacture of a parenterally administrable, substantially neutral, aqueous solution containing, in dissolved state, the sulfa-compound represented by the formula:

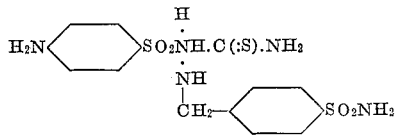

said sulfa-compound being present in the solution in an amount materially exceeding that amount soluble in a volume of water equalling the volume of the solution, that comprises heating together while dissolved in an aqueous medium, two molecular proportions of an alkali metal bisulfite with one molecular proportion of an aldehyde selected from the group consisting of cinnamaldehyde, acrolein and crotonaldehyde, and a half molecular proportion of a sulfapyrimidine, and then mixing the resulting solution of the sulfapyrimidine aldehyde-bisulfite addition product with an equimolecular proportion of said sulfa-compound of the formula above set forth.

2. The process defined in claim 1 wherein the alkali metal bisulfite is sodium bisulfite and the sulfapyrimidine is 2-sulfanilamido-4-methyl-pyrimidine.

3. The process defined in claim 2 wherein the aldehyde is cinnamaldehyde.

4. The process defined in claim 2 wherein the aldehyde is acrolein.

5. The process defined in claim 2 wherein the aldehyde is crotonaldehyde.

6. A parenterally administrable, substantially neutral, aqueous solution containing, in dissolved state, the sulfa-compound represented by the formula:

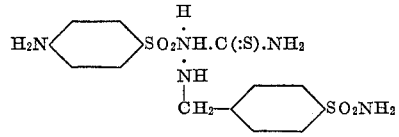

said sulfa-compound being present in the solution in an amount materially exceeding that amount soluble in a volume of water equalling the volume of solution; said solution comprising, per molecular proportion of said sulfa-compound, one half molecular proportion of a sulfapyrimidine condensation product with one molecular proportion of the addition product of an aldehyde chosen from the group consisting of cinnamaldehyde, acrolein and crotonaldehyde with, per molecular proportion of aldehyde, two molecular proportions of an alkali metal bisulfite.

7. A chemotherapeutical agent as defined in claim 6 wherein the alkali metal bisulfite is sodium bisulfite and the sulfapyrimidine is 2-sulfanilamido-4-methyl-pyrimidine.

8. A chemotherapeutical agent as defined in claim 7 further characterized in that the aldehyde is cinnamaldehyde.

9. A chemotherapeutical agent as defined in claim 7 further characterized in that the aldehyde is acrolein.

10. A chemotherapeutical agent as defined in claim 7 further characterized in that the aldehyde is crotonaldehyde.

References Cited in the file of this patent

UNITED STATES PATENTS

| Number | Name | Date |
|---|---|---|
| 2,262,544 | Despois | Nov. 11, 1941 |
| 2,288,531 | Klarer | June 30, 1942 |
| 2,305,260 | Kamlet | Dec. 15, 1942 |
| 2,361,624 | Hamilton | Oct. 31, 1944 |
| 2,381,873 | Braker | Aug. 14, 1945 |
| 2,493,632 | Lott | Jan. 3, 1950 |

FOREIGN PATENTS

| Number | Country | Date |
|---|---|---|
| 118,116 | Australia | Feb. 24, 1944 |
| 572,178 | Great Britain | Sept. 26, 1945 |